US012572995B2

(12) United States Patent
Simaiakis et al.

(10) Patent No.: US 12,572,995 B2
(45) Date of Patent: Mar. 10, 2026

(54) SYSTEMS AND METHODS FOR PLAN DETERMINATION

(71) Applicant: VIA TRANSPORTATION, INC., New York, NY (US)

(72) Inventors: Ioannis Simaiakis, New York, NY (US); Shmulik Marcovitch, Kfar Saba (IL); Shahar Chen, Tel Aviv (IL); Yagil Engel, New York, NY (US); Oren Shoval, Jerusalem (IL); Daniel Ramot, New York, NY (US)

(73) Assignee: VIA TRANSPORTATION, INC., New York, NY (US)

( * ) Notice: Subject to any disclaimer, the term of this patent is extended or adjusted under 35 U.S.C. 154(b) by 0 days.

(21) Appl. No.: 17/737,520

(22) Filed: May 5, 2022

(65) Prior Publication Data

US 2022/0358615 A1 Nov. 10, 2022

Related U.S. Application Data

(60) Provisional application No. 63/185,892, filed on May 7, 2021.

(51) Int. Cl.
G06Q 50/40 (2024.01)
G06Q 10/0631 (2023.01)
(52) U.S. Cl.
CPC ....... G06Q 50/40 (2024.01); G06Q 10/06311 (2013.01)
(58) Field of Classification Search
CPC ..................... G06Q 50/30; G06Q 10/06311
USPC ....................................................... 705/7.13
See application file for complete search history.

(56) References Cited

U.S. PATENT DOCUMENTS

| | | | |
|---|---|---|---|
| 4,212,069 | A | 7/1980 | Baumann |
| 4,502,123 | A | 2/1985 | Minami et al. |
| 4,528,679 | A | 7/1985 | Shahbaz |
| 5,604,676 | A | 2/1997 | Penzias |
| 5,897,629 | A | 4/1999 | Shinagawa |
| 6,459,986 | B1 | 10/2002 | Boyce |
| 7,136,747 | B2 | 11/2006 | Raney |
| 7,146,270 | B2 | 12/2006 | Nozaki |
| 8,082,095 | B2 | 12/2011 | Sumcad et al. |

(Continued)

FOREIGN PATENT DOCUMENTS

| | | |
|---|---|---|
| CA | 2874200 | 11/2013 |
| CN | 103198647 | 7/2013 |

(Continued)

OTHER PUBLICATIONS

Ma, Shuo et al. T-Share: A large scale dynamic taxi ridesharing service, 2013, IEEE, Proceedings of the 29th International Conference on Data Engineering (ICDC0, 2016, pp. 410-421 (year 2013).

(Continued)

*Primary Examiner* — Abdallah A El-Hage Hassan
(74) *Attorney, Agent, or Firm* — PEARL COHEN ZEDEK LATZER BARATZ LLP

(57) ABSTRACT

Systems and methods for determining plans for ridesharing vehicle shifts for a plurality of ride requests that can provide an optimal plan are provided. The systems and methods can involve iteratively planning shifts such that a maximal number of rides can be schedules within a shift within one or more limitations.

15 Claims, 5 Drawing Sheets

(56) References Cited

U.S. PATENT DOCUMENTS

| | | | |
|---|---|---|---|
| 8,220,710 B2 | 7/2012 | Hoffman | |
| 8,412,400 B2 | 4/2013 | D'Andrea | |
| 8,520,695 B1 | 8/2013 | Rubin | |
| 8,538,694 B2 | 9/2013 | Conway | |
| 8,688,532 B2 | 4/2014 | Khunger et al. | |
| 8,799,038 B2 | 8/2014 | Chen | |
| 8,868,529 B2 | 10/2014 | Lerenc | |
| 8,930,133 B2 | 1/2015 | Wurman | |
| 9,068,851 B2 | 6/2015 | Lerenc | |
| 9,074,904 B1 | 7/2015 | Huang et al. | |
| 9,094,824 B2 | 7/2015 | Jayanthi | |
| 9,293,048 B2 | 3/2016 | Fowler | |
| 9,304,009 B2 | 4/2016 | Beaurepaire et al. | |
| 9,322,661 B2 | 4/2016 | Wechsler | |
| 9,441,981 B2 | 9/2016 | Sweeney | |
| 9,448,560 B2 | 9/2016 | D'Andrea | |
| 9,494,439 B1 | 11/2016 | Ross | |
| 9,562,785 B1* | 2/2017 | Racah | G01C 21/3423 |
| 9,599,481 B2 | 3/2017 | Lord | |
| 9,679,489 B2 | 6/2017 | Lambert | |
| 9,689,694 B2 | 6/2017 | Lord | |
| 9,706,367 B2 | 7/2017 | Tao | |
| 9,720,415 B2 | 8/2017 | Levinson | |
| 9,903,721 B2 | 2/2018 | Choi | |
| 9,939,279 B2 | 4/2018 | Pan | |
| 9,965,960 B1 | 5/2018 | McDavitt-Van Fleet | |
| 10,082,793 B1 | 9/2018 | Lin | |
| 10,152,053 B1 | 12/2018 | Smith | |
| 10,156,848 B1 | 12/2018 | Konrardy et al. | |
| 10,168,168 B2* | 1/2019 | Rakah | G01C 21/3492 |
| 10,235,888 B2 | 3/2019 | Moreira-Matias | |
| 10,248,913 B1 | 4/2019 | Gururajan | |
| 10,467,554 B2 | 11/2019 | Yoo | |
| 10,572,964 B2 | 2/2020 | Kim | |
| 10,648,822 B2 | 5/2020 | Newlin | |
| 10,677,602 B2 | 6/2020 | Copeland | |
| 10,762,447 B2 | 9/2020 | Kislovskiy | |
| 11,062,416 B1 | 7/2021 | Jang | |
| 11,361,594 B1 | 6/2022 | Ramalho | |
| 11,466,998 B1 | 10/2022 | Williams | |
| 11,574,263 B2* | 2/2023 | Shoval | G01C 21/3492 |
| 11,620,592 B2* | 4/2023 | Ramot | G06Q 10/06 |
| | | | 701/410 |
| 11,663,532 B2 | 5/2023 | Shimodaira | |
| 11,674,811 B2* | 6/2023 | Shoval | G01C 21/3423 |
| | | | 701/533 |
| 11,860,911 B2 | 1/2024 | Dong | |
| 11,922,816 B1 | 3/2024 | Hansen | |
| 12,033,194 B2 | 7/2024 | Fujimoto | |
| 2001/0037174 A1 | 11/2001 | Dickerson | |
| 2002/0011940 A1 | 1/2002 | Cappel | |
| 2003/0177020 A1 | 9/2003 | Okamura | |
| 2004/0076280 A1 | 4/2004 | Ando | |
| 2004/0088392 A1 | 5/2004 | Barrett | |
| 2004/0093280 A1 | 5/2004 | Yamaguchi | |
| 2004/0158483 A1 | 8/2004 | Lecouturier | |
| 2004/0215382 A1 | 10/2004 | Breed | |
| 2004/0254721 A1 | 12/2004 | Saiki | |
| 2005/0021227 A1 | 1/2005 | Matsumoto | |
| 2005/0280555 A1 | 12/2005 | Warner | |
| 2006/0059023 A1 | 3/2006 | Mashinsky | |
| 2006/0106655 A1 | 5/2006 | Lettovsky et al. | |
| 2006/0178949 A1 | 8/2006 | McGrath | |
| 2006/0208169 A1 | 9/2006 | Breed | |
| 2006/0276960 A1 | 12/2006 | Adamczyk | |
| 2007/0164726 A1 | 7/2007 | de Marcken et al. | |
| 2007/0168239 A1 | 7/2007 | Marcken et al. | |
| 2007/0248220 A1 | 10/2007 | Crandell | |
| 2008/0015923 A1 | 1/2008 | Masaba | |
| 2008/0027772 A1 | 1/2008 | Gernega et al. | |
| 2008/0152036 A1 | 6/2008 | Suzuki | |
| 2008/0189207 A1 | 8/2008 | Wurster | |
| 2008/0195428 A1 | 8/2008 | O'Sullivan | |
| 2008/0270204 A1 | 10/2008 | Poykko | |
| 2008/0277183 A1 | 11/2008 | Huang et al. | |
| 2009/0005963 A1 | 1/2009 | Jarvinen | |
| 2009/0049044 A1 | 2/2009 | Mitchell | |
| 2009/0083111 A1 | 3/2009 | Carr | |
| 2009/0140887 A1 | 6/2009 | Breed | |
| 2009/0177502 A1 | 7/2009 | Doinoff | |
| 2009/0192851 A1 | 7/2009 | Bishop | |
| 2009/0210276 A1 | 8/2009 | Krumm et al. | |
| 2009/0216600 A1 | 8/2009 | Hill | |
| 2009/0248587 A1 | 10/2009 | Van Buskirk | |
| 2009/0254405 A1* | 10/2009 | Hollis | G06Q 10/06315 |
| | | | 705/7.25 |
| 2009/0271227 A1 | 10/2009 | Hayat | |
| 2009/0327011 A1 | 12/2009 | Petroff | |
| 2010/0030594 A1 | 2/2010 | Swart | |
| 2010/0052945 A1 | 3/2010 | Breed | |
| 2010/0280884 A1 | 11/2010 | Levine | |
| 2010/0299177 A1 | 11/2010 | Buczkowski et al. | |
| 2010/0323657 A1 | 12/2010 | Barnard | |
| 2011/0099040 A1 | 4/2011 | Felt | |
| 2011/0125395 A1 | 5/2011 | Mathews | |
| 2011/0130916 A1 | 6/2011 | Mayer | |
| 2011/0130954 A1 | 6/2011 | D'Andrea | |
| 2011/0153629 A1 | 6/2011 | Lehmann | |
| 2011/0191017 A1 | 8/2011 | Certain | |
| 2011/0195699 A1 | 8/2011 | Tadayon | |
| 2011/0213629 A1 | 9/2011 | Clark | |
| 2011/0238457 A1 | 9/2011 | Mason | |
| 2011/0288765 A1 | 11/2011 | Conway | |
| 2011/0301985 A1 | 12/2011 | Camp et al. | |
| 2012/0010912 A1 | 1/2012 | Lele | |
| 2012/0041675 A1 | 2/2012 | Juliver | |
| 2012/0078672 A1 | 3/2012 | Mohebbi | |
| 2012/0109721 A1 | 5/2012 | Cebon | |
| 2012/0232943 A1 | 9/2012 | Myr | |
| 2012/0239452 A1 | 9/2012 | Trivedi | |
| 2012/0290652 A1 | 11/2012 | Boskovic | |
| 2013/0006464 A1 | 1/2013 | Speiser | |
| 2013/0046586 A1 | 2/2013 | Lerner et al. | |
| 2013/0046795 A1 | 2/2013 | Borgerson | |
| 2013/0054281 A1 | 2/2013 | Thakkar et al. | |
| 2013/0060468 A1 | 3/2013 | Delling | |
| 2013/0060586 A1 | 3/2013 | Chen | |
| 2013/0073327 A1 | 3/2013 | Edelberg | |
| 2013/0096827 A1 | 4/2013 | McCall et al. | |
| 2013/0102333 A1 | 4/2013 | Dam | |
| 2013/0110385 A1 | 5/2013 | Heed et al. | |
| 2013/0132140 A1 | 5/2013 | Amin et al. | |
| 2013/0132369 A1 | 5/2013 | Delling et al. | |
| 2013/0159028 A1 | 6/2013 | Lerenc et al. | |
| 2013/0173205 A1 | 7/2013 | Van Houten | |
| 2013/0179205 A1 | 7/2013 | Slinin | |
| 2013/0218455 A1 | 8/2013 | Clark | |
| 2013/0231965 A1 | 9/2013 | Tokatly | |
| 2013/0238167 A1 | 9/2013 | Stanfield et al. | |
| 2014/0011522 A1 | 1/2014 | Lin et al. | |
| 2014/0052481 A1 | 2/2014 | Monteil | |
| 2014/0074757 A1 | 3/2014 | De Gennaro et al. | |
| 2014/0082069 A1 | 3/2014 | Varoglu | |
| 2014/0129302 A1 | 5/2014 | Amin | |
| 2014/0129951 A1 | 5/2014 | Amin | |
| 2014/0172727 A1 | 6/2014 | Abhyanker | |
| 2014/0173511 A1 | 6/2014 | Lehmann et al. | |
| 2014/0180773 A1 | 6/2014 | Zafiroglu et al. | |
| 2014/0188775 A1 | 7/2014 | Lehmann | |
| 2014/0214322 A1 | 7/2014 | Tsimhoni | |
| 2014/0229255 A1 | 8/2014 | Scofield | |
| 2014/0236413 A1 | 8/2014 | D'Andrea | |
| 2014/0278616 A1 | 9/2014 | Stone | |
| 2014/0323167 A1 | 10/2014 | Spearritt | |
| 2014/0324505 A1 | 10/2014 | Lerenc et al. | |
| 2014/0365250 A1* | 12/2014 | Ikeda | G06Q 50/40 |
| | | | 705/5 |
| 2015/0006072 A1 | 1/2015 | Goldberg | |
| 2015/0095122 A1 | 4/2015 | Eramian | |
| 2015/0100238 A1 | 4/2015 | Cai et al. | |
| 2015/0112585 A1 | 4/2015 | Knepper | |
| 2015/0161554 A1 | 6/2015 | Sweeney et al. | |
| 2015/0161564 A1 | 6/2015 | Sweeney | |
| 2015/0204684 A1 | 7/2015 | Rostamian et al. | |

(56)　　　　　References Cited

U.S. PATENT DOCUMENTS

| | | |
|---|---|---|
| 2015/0206437 A1 | 7/2015 | Fowler |
| 2015/0219464 A1 | 8/2015 | Beaurepaire et al. |
| 2015/0242944 A1 | 8/2015 | Willard |
| 2015/0248689 A1 | 9/2015 | Paul |
| 2015/0294430 A1 | 10/2015 | Huang |
| 2015/0310378 A1 | 10/2015 | Van Der Berg |
| 2015/0310379 A1 | 10/2015 | Farrelly et al. |
| 2015/0324717 A1 | 11/2015 | Lord |
| 2015/0324718 A1 | 11/2015 | Lord |
| 2015/0324945 A1 | 11/2015 | Lord et al. |
| 2015/0345951 A1 | 12/2015 | Dutta et al. |
| 2016/0021154 A1 | 1/2016 | Schoeffler |
| 2016/0027306 A1 | 1/2016 | Lambert |
| 2016/0027307 A1 | 1/2016 | Abhyanker |
| 2016/0034845 A1 | 2/2016 | Hiyama |
| 2016/0069694 A1 | 3/2016 | Glaser |
| 2016/0123756 A1 | 5/2016 | Becker |
| 2016/0171574 A1 | 6/2016 | Paulucci |
| 2016/0209220 A1 | 7/2016 | Laetz |
| 2016/0210675 A1 | 7/2016 | Smart |
| 2016/0231128 A1 | 8/2016 | Marks |
| 2016/0253599 A1 | 9/2016 | Lang |
| 2016/0320194 A1 | 11/2016 | Abhyanker |
| 2016/0320195 A1 | 11/2016 | Hansen |
| 2016/0321771 A1 | 11/2016 | Liu et al. |
| 2016/0335576 A1 | 11/2016 | Peng |
| 2016/0349067 A1 | 12/2016 | Fowe |
| 2016/0356615 A1* | 12/2016 | Arata ................. G01C 21/3438 |
| 2016/0358471 A1 | 12/2016 | Hajj |
| 2016/0361970 A1 | 12/2016 | Pebbles |
| 2016/0364678 A1 | 12/2016 | Cao |
| 2016/0364679 A1 | 12/2016 | Cao |
| 2016/0364812 A1 | 12/2016 | Cao |
| 2016/0364823 A1 | 12/2016 | Cao |
| 2017/0039488 A1 | 2/2017 | Raghunathan |
| 2017/0059334 A1 | 3/2017 | Mukherjee |
| 2017/0098377 A1 | 4/2017 | Marco |
| 2017/0116696 A1 | 4/2017 | Lambert |
| 2017/0132540 A1 | 5/2017 | Hapamas |
| 2017/0138749 A1 | 5/2017 | Pan |
| 2017/0146350 A1 | 5/2017 | Beauepaire |
| 2017/0153714 A1 | 6/2017 | Gao et al. |
| 2017/0167882 A1 | 6/2017 | Ulloa Paredes et al. |
| 2017/0169366 A1 | 6/2017 | Klein |
| 2017/0176993 A1 | 6/2017 | Kato |
| 2017/0185948 A1 | 6/2017 | Magazinik |
| 2017/0192437 A1 | 7/2017 | Bier |
| 2017/0227371 A1 | 8/2017 | O'Mahony |
| 2017/0243492 A1 | 8/2017 | Lambert et al. |
| 2017/0248963 A1 | 8/2017 | Levinson et al. |
| 2017/0284819 A1 | 10/2017 | Donnelly |
| 2017/0286884 A1 | 10/2017 | Shoval |
| 2017/0293635 A1 | 10/2017 | Peterson |
| 2017/0300049 A1 | 10/2017 | Seally |
| 2017/0300053 A1 | 10/2017 | Wengreen et al. |
| 2017/0301054 A1 | 10/2017 | Sangoi et al. |
| 2017/0313208 A1 | 11/2017 | Lindsay |
| 2017/0365030 A1 | 12/2017 | Shoham |
| 2018/0032928 A1 | 2/2018 | Li |
| 2018/0046944 A1 | 2/2018 | Barbera |
| 2018/0073882 A1 | 3/2018 | North |
| 2018/0080263 A1 | 3/2018 | Rose |
| 2018/0087915 A1 | 3/2018 | Marco |
| 2018/0091604 A1 | 3/2018 | Yamashita |
| 2018/0096606 A1 | 4/2018 | Rakah |
| 2018/0113880 A1 | 4/2018 | Metcalf-Putnam |
| 2018/0121847 A1 | 5/2018 | Zhao |
| 2018/0135993 A1 | 5/2018 | Thangaraj |
| 2018/0136005 A1 | 5/2018 | Forutanpour |
| 2018/0181128 A1 | 6/2018 | Urano |
| 2018/0189682 A1 | 7/2018 | Seacat |
| 2018/0191863 A1 | 7/2018 | Matthieson et al. |
| 2018/0197418 A1 | 7/2018 | Chu |
| 2018/0209803 A1 | 7/2018 | Rakah |
| 2018/0209805 A1 | 7/2018 | Rakah |
| 2018/0211124 A1 | 7/2018 | Alonso-Mora |
| 2018/0211186 A1 | 7/2018 | Rakah |
| 2018/0211218 A1 | 7/2018 | Berdinis |
| 2018/0211228 A1 | 7/2018 | Narayan |
| 2018/0211541 A1 | 7/2018 | Rakah |
| 2018/0224866 A1 | 8/2018 | Alonso-Mora |
| 2018/0231984 A1 | 8/2018 | Alonso-Mora |
| 2018/0251122 A1 | 9/2018 | Golston |
| 2018/0259976 A1 | 9/2018 | Williams |
| 2018/0260787 A1 | 9/2018 | Xi |
| 2018/0290610 A1 | 10/2018 | Zych |
| 2018/0338225 A1 | 11/2018 | Shimizu |
| 2018/0340790 A1 | 11/2018 | Kislovskiy et al. |
| 2018/0342035 A1 | 11/2018 | Sweeney |
| 2018/0342165 A1 | 11/2018 | Tao |
| 2018/0348772 A1 | 12/2018 | Stefan |
| 2018/0356239 A1 | 12/2018 | Marco |
| 2018/0376305 A1 | 12/2018 | Liu |
| 2019/0017839 A1 | 1/2019 | Liu |
| 2019/0056233 A1 | 2/2019 | Liu |
| 2019/0086221 A1 | 3/2019 | Thiyagarajan |
| 2019/0108468 A1 | 4/2019 | Mguyen |
| 2019/0114595 A1 | 4/2019 | Eyler |
| 2019/0114638 A1 | 4/2019 | Flores |
| 2019/0120640 A1 | 4/2019 | Ho |
| 2019/0122561 A1 | 4/2019 | Shimizu |
| 2019/0156254 A1 | 5/2019 | Gururajan |
| 2019/0156451 A1 | 5/2019 | Kitagishi |
| 2019/0156646 A1 | 5/2019 | Richey |
| 2019/0171943 A1 | 6/2019 | Pao et al. |
| 2019/0172129 A1 | 6/2019 | Bhattacharjee |
| 2019/0188608 A1 | 6/2019 | Gururajan |
| 2019/0195639 A1 | 6/2019 | Malewicz |
| 2019/0197132 A1 | 6/2019 | Sharma |
| 2019/0204096 A1 | 7/2019 | Cai |
| 2019/0204097 A1 | 7/2019 | Starns |
| 2019/0205842 A1 | 7/2019 | Starns |
| 2019/0206258 A1 | 7/2019 | Chang et al. |
| 2019/0212149 A1 | 7/2019 | Ho |
| 2019/0259182 A1 | 8/2019 | Sarukkai et al. |
| 2019/0265059 A1 | 8/2019 | Warnick |
| 2019/0271552 A1 | 9/2019 | Choi et al. |
| 2019/0311307 A1 | 10/2019 | Ramot |
| 2019/0325757 A1 | 10/2019 | Goel |
| 2020/0010090 A1 | 1/2020 | Matsuda |
| 2020/0019894 A1 | 1/2020 | Jin |
| 2020/0042019 A1 | 2/2020 | Marczuk |
| 2020/0082314 A1 | 3/2020 | Crapis |
| 2020/0104965 A1 | 4/2020 | Ramot |
| 2020/0151291 A1 | 5/2020 | Bhattacharya |
| 2020/0151631 A1 | 5/2020 | Lamers |
| 2020/0151885 A1 | 5/2020 | Yang |
| 2020/0160476 A1 | 5/2020 | Ramot |
| 2020/0160477 A1 | 5/2020 | Ramot |
| 2020/0160478 A1 | 5/2020 | Ramot |
| 2020/0160705 A1 | 5/2020 | Chase |
| 2020/0160709 A1* | 5/2020 | Ramot ................. G06Q 10/047 |
| 2020/0160718 A1 | 5/2020 | Saleh |
| 2020/0174487 A1 | 6/2020 | Viswanathan |
| 2020/0191584 A1 | 6/2020 | Kamata |
| 2020/0193834 A1 | 6/2020 | Qin |
| 2020/0273328 A1 | 8/2020 | Muberek |
| 2020/0279195 A1 | 9/2020 | Kobori |
| 2020/0286199 A1 | 9/2020 | Maddipati |
| 2020/0286391 A1 | 9/2020 | Beaurepaire |
| 2020/0333146 A1 | 10/2020 | Shoval |
| 2020/0334987 A1* | 10/2020 | Shoval ............... G01C 21/3415 |
| 2020/0349666 A1 | 11/2020 | Hodge |
| 2020/0361406 A1 | 11/2020 | Zych |
| 2020/0364627 A1 | 11/2020 | Qin |
| 2020/0393256 A1 | 12/2020 | Sahin |
| 2021/0020047 A1 | 1/2021 | Kuhn |
| 2021/0073825 A1 | 3/2021 | Walling |
| 2021/0089986 A1 | 3/2021 | Carvalho |
| 2021/0148720 A1* | 5/2021 | Yasui ................. G01C 21/3617 |
| 2021/0173855 A1 | 6/2021 | Liu |
| 2021/0248520 A1 | 8/2021 | Krishnamurthy et al. |
| 2021/0250232 A1 | 8/2021 | Mahimkar |
| 2021/0295706 A1 | 9/2021 | Shoval |

(56) References Cited

U.S. PATENT DOCUMENTS

| | | | |
|---|---|---|---|
| 2021/0302175 A1 | 9/2021 | Pishdadian | |
| 2022/0003561 A1* | 1/2022 | Shoval | G01C 21/3415 |
| 2022/0027818 A1* | 1/2022 | Jin | G06Q 10/06315 |
| 2022/0120572 A9 | 4/2022 | Shoval | |
| 2022/0164364 A1 | 5/2022 | Funk | |
| 2022/0164911 A1 | 5/2022 | Stumpf | |
| 2023/0119116 A1 | 4/2023 | Xu | |
| 2023/0394613 A1 | 12/2023 | Marcovitch | |
| 2024/0232273 A1 | 7/2024 | Pana | |

FOREIGN PATENT DOCUMENTS

| | | | |
|---|---|---|---|
| CN | 103279669 | 9/2013 | |
| CN | 103327440 | 9/2013 | |
| CN | 104751625 | 7/2015 | |
| EP | 2605149 | 6/2013 | |
| EP | 2665050 | 11/2013 | |
| EP | 2792538 | 10/2014 | |
| EP | 3023740 | 5/2016 | |
| EP | 3472563 | 4/2019 | |
| EP | 3574459 | 12/2019 | |
| EP | 3631707 | 4/2020 | |
| EP | 3640596 | 4/2020 | |
| EP | 3659078 | 6/2020 | |
| EP | 3738085 | 11/2020 | |
| EP | 3776395 | 2/2021 | |
| EP | 3659078 B1 * | 8/2023 | G06Q 50/40 |
| ES | 2525738 | 12/2014 | |
| GB | 2397683 | 7/2004 | |
| JP | 2003006294 | 1/2003 | |
| JP | 2003233656 | 8/2003 | |
| JP | 2003271706 | 9/2003 | |
| JP | 2003281422 | 10/2003 | |
| JP | 2004062490 | 2/2004 | |
| JP | 2004192366 | 7/2004 | |
| JP | 2004362271 | 12/2004 | |
| JP | 2009-069117 | 4/2009 | |
| JP | 2010231258 | 10/2010 | |
| JP | 2011214930 | 10/2011 | |
| JP | 2019525299 | 9/2019 | |
| JP | 2020522789 | 7/2020 | |
| KR | 20090044693 | 5/2009 | |
| KR | 20100053717 | 5/2010 | |
| KR | 101752159 | 6/2017 | |
| KR | 102064376 | 2/2020 | |
| KR | 20210155209 | 12/2021 | |
| SG | 2012065264 | 4/2014 | |
| WO | WO2006128946 | 12/2006 | |
| WO | WO2011066468 | 6/2011 | |
| WO | WO2012143300 | 10/2012 | |
| WO | WO2014106617 | 7/2014 | |
| WO | WO2016209595 | 12/2016 | |
| WO | WO2017223031 | 12/2017 | |
| WO | WO2018140505 | 8/2018 | |
| WO | WO-2018140505 A1 * | 8/2018 | B60W 60/00253 |
| WO | WO2018217640 | 11/2018 | |
| WO | WO2019023324 | 1/2019 | |
| WO | WO2019136341 | 7/2019 | |
| WO | WO2019199766 | 10/2019 | |

OTHER PUBLICATIONS

Wen He; Kai Hwang; Deyi Li, Intelligent carpool routing for urban ridesharing by mining GPS trajectories, IEEE Transactions on intelligent transportation systems; year 2014, vol. 15, Issue 5, pp. 2286-2296; DOI 10.1109/TITS.2014.2315521

Dejan Dimitrijevic, Nernanja Nedjc, Vladimir Dimitrieski, Real-time carpooling and ride-sharing: Position paper design concepts, distribution and cloud computing strategies; Computer Science and Information Systems (FedCSIS) 2013 Federated Conference on year 2013, pp. 781-786; Referenced in IEEE Conference Publications.

Harini Sirisena, Ride Buddies-Multi agent system for ride sharing/carpooling; Advances in ICT for Emerging Regions (ICTer) 2014 International Conference year 2014; pp. 252-252, DOI:10.1109/ICTER.2014.7083910: Referenced IEEE Conference Publications DOI:10.1109/ICTER.2014.7083910: Referenced IEEE Conference Publications.

Chung-Min Chen, David Shallcross, Yunng-Chien Shih. Yen-Ching Wu, Sheng-Po Kou, Yuan-Ying Hsi, Yuhsiang Holderby, William Chou, Smart ride share with flexible route matching: Chung-Min Chen, David Shallcross, Advanced Communication Technology (ICACT) 2011, 13th International Conference, pp. 1506-1510.

Nianbo Liu; Ming Liu; Jiannong Cao; Guihai Chen; Wei Lou, When transportation meets communication: V2P over VANETs; Distributed Computing Systems (ICDCS) 2010, IEEE 30th International Conference year 2010, pp. 567-576, DOI:10.1109/ICDCS.2010.83

Li et al., A dynamic pricing method for carpooling service based on coalition at game analysis; 2016 IEEE 18th Intern Conf on High Performance Computing and Comm; IEEE 14th Intern Conf on Smart City IEEE 2nd Intern Conf on Data Science and Systems (hpcc/SmartCity/dss9HPCC/Smartcity/DSS) year 2016 pp. 78-85; DOI:10.1109/HPCC-Smart City-DSS) year 2016, pp. 78-85, DOI:10.1109/HPCC-SmartCity-DSS.2016.0022

Lasse Korsholm Poulsen, Daan Dekkers, Nicolaas Wagenaar; Wesley Snijders; Ben Lewinsky; Raghava Rao Mukkamala; Ravi Valrapu; Green cabs vs. Uber in New York City, 2016 IEEE international Congress on Big Data (BigDataCongress) Year 2016:pp. 222-229, DOI: 10.1109/BigDataCongress.2016.35.

Hawkins, Andrew, Uberhop is Uber's Latest idea for killing mass transit, Dec. 8, 2015, The Verge, p. 1-4.

Alonso-Mora, Javier et al. "On-Demand High-Capacity Ride-Sharing via Dynamic Trip-Vehicle Assignment." Proceedings of the National Academy of Sciences 114, 3 (Jan. 2017): 462-467 © 2017 National Academy of Sciences.

Mora, Supplemental Material—On Demand high-capacity ride-sharing via dynamic trip-Vehicle assignment, Jul. 20, 2016, p. 1-36.

Whitney, Alyse, I took Via to work every day for a month. Here's what I learned, May 10, 2016, p. 1-3.

Y. Hou, W. Zhong, L. Su, K. Hulme, A. W. Sadek and Qiao, "TASeT: Improving the Efficiency of Electric Taxis With Transfer-Allows Rideshare", in IEEE Transactions on Vehicular Technology, vol. 56., No. 12, pp. 9518-9528, Dec. 2016, doi:10.1109//TVT.2016.2592983. (Year 2016).

Agatz, Niels, et al. "Optimization for dynamic ride-sharing: A review." European Journal ofOperational Research 223.2 (2012): 295-303 (year:2012).

Office Action for European Appl. No. 18731617.9 dated Jan. 25, 2022.

Office Action for U.S. Appl. No. 16/752,381 dated Apr. 14, 2022.

Office Action for European Appl. No. 19702319.5 dated Jan. 25, 2022.

Office Action for European Appl. No. 18758779.5 dated Nov. 8, 2021.

Office Action for European Appl. No. 19702319.5 dated Oct. 26, 2021.

Office Action for European Appl. No. 18703675.1 dated Oct. 8, 2021.

Office Action for Japanese Appl. No. 2019-564501 dated Jan. 27, 2021.

Office Action for U.S. Appl. No. 16/752,281 dated Apr. 14, 2022.

Office Action for U.S. Appl. No. 16/921,257 dated Mar. 31, 2022.

Notice of Allowance for U.S. Appl. No. 16/750,679 dated May 3, 2021.

Office Action for U.S. Appl. No. 15/916,373 dated Dec. 16, 2020.

Office Action for U.S. Appl. No. 16/751,321 dated May 17, 2022.

Office Action for U.S. Appl. No. 16/920,012 dated Jun. 6, 2022.

Paz Linares M. et al. A simulation framework for real-time assessment of dynamic ride sharing demand responsive transportation models, Dec. 11, 2016; Dec. 11, 2016-Dec. 14, 2016, Dec. 11, 2016, pp. 2216-2227, XP058310070, DOI:10.1109/WSC.2016.7822263 ISBN: 987-1-5090-4484-9.

Baouche et al., Efficient Allocation of Electric Vehicle Charging Stations . . . Year 2014.

(56)　　　　　References Cited

OTHER PUBLICATIONS

I. Portugal et al., A Framework for spatial-Temporal Trajectory Cluster Analysis based on Dynamic Relationships, IEEE Access, vol. 8, pp. 169775-169793, 2020.

Ridesharing in North America: Past, Present, and Future, by Nelson D. Chan and Susan Shaheen, published in Transport Reviews, vol. 32, No. 1, 93-112, Jan. 2012.

Los Angeles Smart Traveler Field Operational Test Evaluation, Genevieve Giuliano, Randolph W. Hall, and Jacqueline M. Golob, University of Southern California, California PATH Research Report UCB-ITS-PRR-95-41, Dec. 1995.

Seattle Smart Traveler, Daniel J. Dailey, Donald Loseff, David Meyers, Washington State Transportation Center (TRAC), Oct. 1997, Cite Only.

Dynamic Taxi-sharing Service Using Intelligent Transportation System Technologies, Chi-Chung Tao, IEEE, 3209-3212, 2007.

A Survey of Mobile Phone Sensing, Nicholas D. Lane, Emiliano Miluzzo, Hong Lu, Daniel Peebles, Tanzeem Choudhury, and Andrew T. Campbell, IEEE Communications Magazine, 140-150, Sep. 2010.

The Research and Implementation of GPS Intelligent Transmission Strategy Based on on-board Android Smartphones, Zhiqiang Wei, Yaqing Song, Hao Liu, Yanxiu Sheng, and Xi Wang, IEEE, 1230-1233, 2013, Abstract Only.

Smarter transportation case study #10: Dynamic Ridesharing in Cork., Transportation for America, https://web.archive.org/web/20111007214904/http://t4america.or g/blog/2 . . . ter-transportation-case-study-10-dynamic-ridesharing-in-cork-ireland/, Crawled 2011, Retrieved Nov. 15, 2021.

Avego Real-Time Ridesharing, Avego Ltd., https://web.archive.org/web/20111021225957/http://www.avego.com:80/st/realtime.php , Crawled 2011, Retrieved Nov. 15, 2021.

Avego Introduction, Avego Ltd., https://web.archive.org/web/20111102165609/http://www.avego.com:80/st/index.php Crawled 2011, Retrieved Nov. 15, 2021.

Understanding the NAVSTAR GPS, GIS, and IVHS 2nd Edition, Tom Logsdon, Van Nostrand Reinhold, 1995.

Behind the Success of the CVCC Engine, Honda Worldwide, https://web.archive.org/web/20070219081359/http:/world.honda.com/history/challenge/1981navigationsystem/text/01.html, Crawled 2007, Retrieved Dec. 13, 2021.

The Final Test: From Suzuka to Tokyo, Honda Worldwide, https://web.archive.org/web/20070221131328/http://world.honda.com/history/challenge/1981navigationsystem/text/06.html, Crawled 2007, Retrieved Dec. 13, 2021.

Creating a Progressive Strategy, Honda Worldwide, https://web.archive.org/web/20070221131445/http://world.honda.com/history/challenge/1981navigationsystem/text/02.html, Crawled 2007, Retrieved Dec. 13, 2021.

Map Navigation Software of the Electro-Multivision of the '91 Toyota Soarer, Kunihiro Ishikawa, Michima Ogawa, Shiegtoshi Azuma, and Tooru Ito, IEEE Vehicle Navigation and Information Systems Conference, 463-473, 1991.

Automobile Navigation: Where is it Going?, Robert L. French, IEEE Aerospace and Electronic Systems Magazine, vol. 2, Issue: 5, 6-12, May 1987.

TravTek Global Evaluation and Executive Summary, V.W. Imnan and J.I. Peters, U.S. Department of Transportation Federal Highway Administration, Pub. No. FHWA-RD-96-031, Mar. 1996.

TravTek System Architecture Evaluation, C. Blumentritt, K. Balke, E. Symour, and R. Sanchez, U.S. Department of Transportation Federal Highway Administration, Pub. No. FHWARD-94-141, Jul. 1995.

Historical overview of automobile navigation technology, Robert L. French, 36th IEEE Vehicular Technology Conference, 1986.

A Qualitative and Quantitative Analysis of Real Time Traffic Information Providers, Tim Paul Bauer, Janick Edinger, and Christian Becker, Proceedings of the 4th IEEE International Workshop on Pervasive Context, 2019.

The Dynamic Traffic Information Collection and Processing Methods of ITS Common Information Platform Based on Floating Car Technology, Haowei Su and Wei Zhang, IEEE 2008 International Seminar on Future BioMedical Information Engineering, 156-159, 2008.

Schreieck et al. A Matching Algorithm for Dynamic Ridesharing, Transportation Research Procedia, 19, 2016 ,272-285.

Gruebele, P. "Interactive system for real time dynamic multi-hop carpooling." Global Transport Knowledge Partnership (2008): 1-17.

Horn, Mark et Procedures for planning multi-leg journeys with fixed-route and demand-responsive passenger transport services, Transportation Research Part C:Emerging Technologies 12.1 (2004):33-55 (Year: 2004).

Furuhata et al., Ridesharing: The state-of-the-art and future directions,|transportation Research Part B 57 (2013) 28-46.

Goel, Preeti, Lars Kulik and Kotagiri Ramamohanarao , Optimal pick up point selection for effective ride sharing, IEEEE Transactions on Big Data 3.2 (2016): 154-168 (Year:2016).

Ta, Na, et al. "An efficient ride-sharing framework for maximizing shared route." IEEE Transactions on Knowledge and Data Engineering 30.2 (2017): 219-233. (Year: 2017).

Tong, Wei, Jingyu Hua, and Sheng Zhong. "A jointly differentially private scheduling protocol for ridesharing services." IEEE Transactions on Information Forensics and Security 12.10 (2017): 2444-2456. (Year: 2017).

Ota, Masayo, et al. "Stars: Simulating taxi ride sharing at scale." IEEE Transactions on Big Data 3.3 (2016): 349-361. (Year: 2016).

Freiberg, German, et al. Demand Responsive Transit: Understanding Emerging Solutions, WR, Mexico, May 2021: 1-58.

Sottini, Francesco et al., Andiamo: A multiagent system to provide a mobile-based rideshare service, 2006.

Wang et al., Utilizing taxi empty cruise time to solve the short distance trip problem, ITS World Congress, year 2010.

Celes Clayson Claysonceles@DCC UFMG BR et al: "Mobility Trace Analysis for Intelligent Vehicular Networks", ACM Computing Surveys, ACM, New York, NY, US, US, vol. 54, No. 3, Apr. 17, 2021 (Apr. 17, 2021) pp. 1-38, XP058679020, ISSN: 0360-0300, DOI: 10.1145/3446679.

Rahul Das et al: "Automated Urban Travel Interpretation: A Bottom-up Approach for Trajectory Segmentation", Sensors, vol. 16, No. 11, Nov. 23, 2016 (Nov. 23, 2016), p. 1962, XP055709160, DOI: 10.3390/s16111962.

Agatz, Niels et al. Sustainable Passenger Transportation: Dynamic Ride-Sharing, Erasmus Research Institute of Management (ERIM) Report Series Research in Management, Feb. 2010, 30 pages.

Yang, Funing, et al. "Future-Aware Balanced Preference Matching for Real-Time On-Demand Taxi Dispatch." IEEE Internet of Things Journal (Year: 2024).

E. Bakiris et al."Clustered-NSGA-II+: A Multi-Objective Evolutionary Genetic Algorithm for Solving the Ride-Sharing Problem with the Same Destination," 2024 15th Inter Conf on Information, Intelligence, Syst & Applications (USA), Chania Crete, Greece, 2024 pp. 1-8, doi: 10.1109 (Year: 2024).

Cheng, Yurong, et al. "Cross Online Ride-Sharing for Multiple-Platform Cooperations in Spatial Crowdsourcing." 2024 IEEE 40th International Conference on Data Engineering (ICDE). IEEE, (Year: 2024).

Amilbek, Nurbolat, et al. "Development of a Deep Learning Model for Forecasting and Optimizing Ride-Sharing Routes." Journal of Problems in Computer Science and Information Technologies 3.1 : 56-71 (Year: 2025).

Minett, Paul, Albany Village and John Pearce, Flexible carpooling: challenging the ride match paradigm, saving energy by making it easier to share rides, Energy Policy Journal 21.3 (2008): 134-159.

Narman, Husnu S., Haroon Malik and Govind Yatnalkar, An enhanced rider sharing model based on human characteristics machine learning recommender system, and user threshold time, Journal of Ambient Intelligence and Humanized Computing, 12.1, 2021:13-26.

Yan, Xiang, Xinyu Liu and Xilei Zhao, Using machine learning for direct modeling of ridesourcing services in Chicago, Journal of Transport Geography 83, 2020:102661.

(56)                    References Cited

OTHER PUBLICATIONS

Notice of Allowance from U.S. Appl. No. 17/856,393 dated Jul. 22, 2025.
Office Action from U.S. Appl. No. 18/326,481 dated Aug. 20, 2025.
Office Action from U.S. Appl. No. 17/890,789 dated Aug. 13, 2025.
Final Office Action from U.S. Appl. No. 18/326,603 dated Jun. 18, 2025.
Office Action for U.S. Appl. No. 17/721,562 dated Sep. 26, 2025.
Office Action for U.S. Appl. No. 18/611,259 dated Sep. 30, 2025.
Office Action for U.S. Appl. No. 17/915,732 dated Oct. 14, 2025.

* cited by examiner

SYSTEMS AND METHODS FOR PLAN DETERMINATION

CROSS REFERENCE TO RELATED APPLICATIONS

This application claims the benefit of and priority to U.S. Provisional Patent Application No. 63/185,892, filed May 7, 2021, the entire contents of which are owned by the assignee of the instant application and incorporated herein by reference in their entirety.

FIELD OF THE INVENTION

The invention relates generally to vehicle ridesharing, and systems and methods for ridesharing management.

BACKGROUND OF THE INVENTION

Recent years have witnessed increasing interest and development in the field of vehicle sharing, where one or more riders may share the same vehicle for a portion of their rides. Ridesharing may save ride costs, increase vehicle utilization, and reduce air pollution. A rider may use a ridesharing service through a ridesharing service application accessed by the rider's mobile device.

Ridesharing service can be performed with a car, van, and/or bus. Ridesharing service can include scheduling pick-ups and drop-offs of riders, determining routes for vehicles, and/or modifying routes for vehicles on the fly. Ridesharing services can operate as fixed route, semi-fixed route, and/or full point-to-point services, and vehicles can be commanded to operate in any of those modes and/or be switched between those service types.

Currently, ridesharing management systems typically receive a list of ride requests (e.g., a list or request for the following day), and schedule them for the next day within a number of driver shifts available from a set of prescheduled drivers. This can cause an excess or shortage of drivers if, for example, the list of ride requests is smaller or larger in comparison to the number of drivers, and/or cause scheduling inefficiencies. Therefore, it can be desirable for rideshare management systems to create a plan for driver shifts that meets the list of ride requests in an optimal amount of time with an optimal number of driver shifts.

SUMMARY

Advantages of the invention can include creating a plan for driver shifts that meets the list of ride requests in an optimal amount of time with an optimal number of driver shifts.

In one aspect, the invention involves a system for managing a fleet of ridesharing vehicles. The system includes a communications interface configured to receive a plurality of ride requests from a plurality of users. The system also includes at least one processor configured to: i) determine a plan for a shift of a ridesharing vehicle wherein the plan is based on the plurality of ride requests, a duration of the shift for the ridesharing vehicle and one or more limitations of the ridesharing vehicles, wherein the plan results in assigning a subset of the plurality of ride requests to the shift, ii) remove the subset of the plurality of ride requests from the plurality of ride requests; and iii) if there are a remaining unassigned plurality of ride requests, return to step i), otherwise transmitting each determined plan to each of the respective ridesharing vehicles.

In some embodiments, the plurality of ride requests are received over a predefined time duration. In some embodiments, the plurality of ride requests includes pick-up time and pick-up location. In some embodiments, each plan includes a start time, an end time, a driver start break time and a driver end break time. In some embodiments, the one or more limitations includes a maximum duration a driver can continuously drive, a number of breaks, a duration for each break, minimal time for a shift, total length of the shift, or any combination thereof.

In some embodiments, to determine a plan, the processor is further configured to segment the shift and determine an optimal shift from the segments, wherein segmenting is based on when the vehicle is empty, before every pick up and drop off, after a predetermined duration or any combination thereof, and wherein determining an optimal shift is based on a distance of each segment's potential first pick-up location to a nearest vehicle depot, distance for each potential last drop-off to a nearest vehicle depot, utilizations for the segment, shift length or any combination thereof.

In some embodiments, the processor is further configured to assign each determined plan to a corresponding vehicle.

In another aspect, the invention involves a method for managing a fleet of ridesharing vehicles. The method involves receiving, via a communications interface, a plurality of ride requests from a plurality of users. The method involves determining, via a processor, a plan for a shift of the ridesharing vehicle wherein the plan is based on the plurality of ride requests, a duration of the shift for the ridesharing vehicle and one or more limitations of the ridesharing vehicles, wherein the plan results in assigning a subset of the plurality of ride requests to the shift. The method involves removing, via the processor, the subset of the plurality of ride requests from the plurality of ride requests. The method involves returning to determining a plan for a shift of the ridesharing vehicle if there are remaining unassigned plurality of ride requests; otherwise transmitting each determined plan to each of the respective ridesharing vehicles.

In some embodiments, the plurality of ride requests are received over a predefined time duration. In some embodiments, the plurality of ride requests includes pick-up time and pick-up location. In some embodiments, each plan includes a start time, an end time, a driver start break time and a driver end break time. In some embodiments, the one or more limitations includes a maximum duration a driver can continuously drive, a number of breaks, a duration for each break, minimal time for a shift, total length of the shift, or any combination thereof.

In some embodiments, determining a plan further comprises segmenting the shift and determining an optimal shift from the segments, wherein segmenting is based on when the vehicle is empty, before every pick-up and drop-off, after a predetermined duration or any combination thereof, and wherein determining an optimal shift is based on a distance of each segment's potential first pick-up location to a nearest vehicle depot, distance for each potential last drop-off to a nearest vehicle depot, utilizations for the segment, shift length or any combination thereof.

In some embodiments, the method involves assigning each determined plan to a corresponding vehicle.

The foregoing general description and the following detailed description are exemplary and explanatory only and are not restrictive of the claims.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Figure 1:
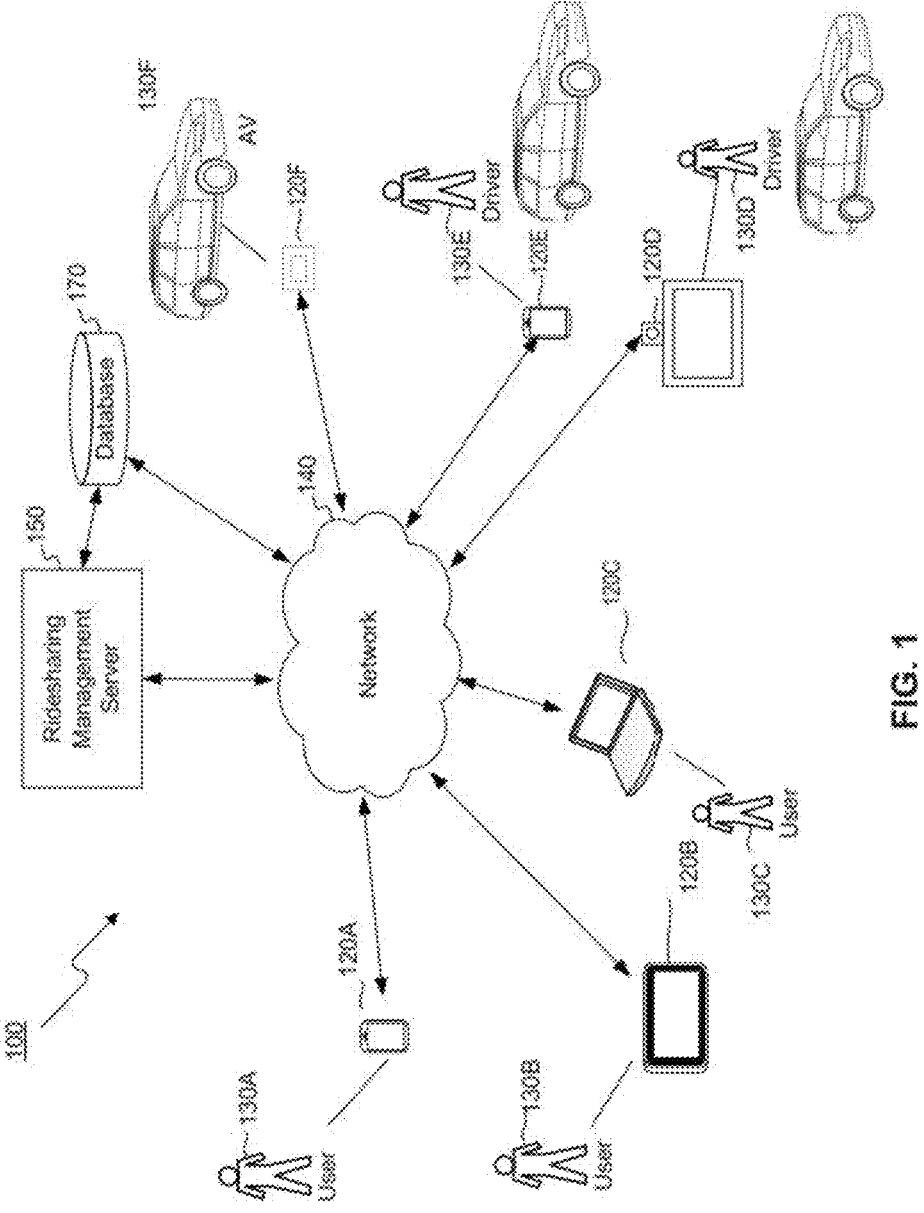
FIG. 1 is a diagram of a ridesharing management system, according to some embodiments of the invention.

FIG. 1 is a diagram of a ridesharing management system 100, according to some embodiments of the invention. The ridesharing management system 100 includes one or more user devices 120A-120F (collectively referred to as user devices 120) associated with respective users 130A-130F, a network 140, a ridesharing management server 150, and a database 170. The user devices 120 can be mobile communications devices.

The users 130A-130F can be riders, drivers and/or other computing systems. In FIG. 1, users 130A-130C are riders, users 130D-130E are drivers, and user 130F is an autonomously driven vehicle user. The user devices 120A-120F can be associated with riders, drivers, and/or other computing systems, such that user devices 120A-120C can be referred to as rider devices, 120D-120E can be referred to as driver devices, and user device 120F can be referred to as a driving-control device.

The network 140 can be coupled to the user devices 120 to facilitate communications between the user devices 120 and the ridesharing management server 150. For example, the rider 130A can request a ride via the rider device 120A that is a smart phone. The request can be transmitted by the user device 120A to the ridesharing management server 150 through the network 140. The ridesharing management server 150 can transmit a route to the driver device 120E to instruct the driver 130E to pick-up the rider 130A. The ridesharing management server 150 can transmit a message to the rider 130A via the rider device 120A indicating that the driver 130E is on its way and the message can instruct the rider 130A to a particular pick-up location.

The network 140 can facilitate communications that include receiving ride requests and/or other ride related input from or sending confirmations to the rider devices 120A-120C and/or sending ride service assignments to the driver devices 120D-120E and driving-control device 120F.

The network 140 can be any type of network that provides communications, exchanges information, and/or facilitates the exchange of information between ridesharing management server 150 and user devices 120. For example, network 140 can be the Internet, a Local Area Network, a cellular network, a public switched telephone network ("PSTN"), and/or other suitable connection(s) that enables ridesharing management system 100 to send and/or receive information between the components of the ridesharing management system 100. The network 140 can be wired and/or wireless depending on the type of connection to the network 140. Although the network 140 is shown herein as a cloud, the network 140 can include a variety of computing components, including wired and wireless components in various networked configurations to facilitate desired communication between components.

The network 140 can support a variety of messaging formats as is known in the art, and may support a variety of services and applications for user devices 120. For example, the network 140 can support navigation services for user devices 120, such as directing users and/or ridesharing service vehicles to pick-up and/or drop-off locations.

The ridesharing management server 150 can be a system that communicates with and/or is part of a communication service provider which provides a variety of data or services, such as voice, messaging, real-time audio/video, to users, such as users 130A-130E. The ridesharing management server 150 can be a computer-based system including computer system components, desktop computers, workstations, tablets, handheld mobile communications devices, memory devices, and/or internal network(s) connecting the components.

The ridesharing management server 150 can receive information from user devices 120 over the network 140, process the information, store the information, and/or transmit information to mobile communications devices 120 over network 140. The ridesharing management server 150 can receive ride requests from user devices 120A-120C. The ridesharing management server 150 can send ride confirmation and/or ride fare information to user devices 120A-120C. The ridesharing management server 150 can send ride service assignments (e.g., including pick-up and/or drop-off location information) to driver devices 120D and 120E, and driving-control device 120F.

The ridesharing management server 150 can receive user input from user devices 120A-120C. For example, the ridesharing management server 150 can receive various ride service parameters, such as walking distance to a pick-up location, maximum delay of arrival/detour, and/or maximum number of subsequent pick-ups.

The rideshare vehicle can be a car, van, SUV, truck, bus or any kind of vehicle suitable for human transportation. In some embodiments, a vehicle is a taxi. In some embodiments, a rideshare vehicle can be an autonomous vehicle, wherein a control device integrated with the vehicle or a management system separate from the vehicle can send operational messages.

The ridesharing management server 150 can calculate ride fares based on a solo portion of a user's ride and a shared portion of the ride. The ride fare calculation can be based on various ride service parameters set by the user, such as the walking distance involved in the ride, and/or user selection regarding toll road usage.

The database 170 may include one or more physical and/or virtual storages coupled with the ridesharing management server 150. The database 170 can store user account information (e.g., registered rider and/or driver accounts) and/or corresponding user profiles (e.g., contact information, profile photos, and/or associated mobile communications device information). User account information for a rider can include ride history, service feedback, complaints, and/or comments. User account information for a driver can include number of ride service assignments completed, ratings, and/or ride service history information. The database 170 can store various ride requests received from user devices 120A-120C. Each ride request can include a corresponding starting point and desired destination information, user input regarding various service parameters, pick-up and drop-off locations, time of pick-up and drop-off, ride fares, and/or other user feedback (e.g., user comments).

The database 170 may include traffic data, maps, and/or toll road information, which may be used for ridesharing service management. The traffic data may include historical traffic data and/or real-time traffic data regarding a certain geographical region. The traffic data may be used to determine traffic conditions. Traffic data and traffic conditions can be used to estimate pick-up and drop-off times for riders and/or determine an optimal route for a particular ride or for all rides. The real-time traffic data may be received from a real-time traffic monitoring system, which may be integrated into or independent from ridesharing management system 100.

The maps may include map information (e.g., roads, streets and/or distances) typically used for navigation purposes. The map information can be used to determine potential routes and in transit routes for the rideshare vehicles and/or guiding the users to a pick-up or drop-off location. Guiding the users to a pick-up or drop-off location can include displaying a map, outputting audio, displaying a list of directions or any combination thereof. The in-transit routes can be modified based on adding or reducing passengers, the driver driving off the route, speed and/or other updates. Toll road information may include amount of toll charges regarding certain roads, and any change or updates thereof. Toll road information may be used to calculate ride fares. In some embodiments, a rider can specify that the rideshare vehicle route avoids toll roads.

The data stored in database 170 can be transmitted to the ridesharing management server 150 for accommodating ride requests. In some embodiments, the database 170 is stored in a cloud-based server (not shown) that is accessible by the ridesharing management server 150 and/or user devices 120 through the network 140. In some embodiments, the database 170 reside within the ridesharing management server 150.

The database 170 can include a list of ridesharing vehicles with their corresponding shift availability. The shift availability can include day, start time, stop time, maximum shift duration, and/or labor rules associated with the respective driver for the shift. The shift availability can be input by a user (e.g., a ridesharing provider).

During operation, the ridesharing management server 150 can communicate with the driving-control device 120F to direct the autonomous vehicle 130F to pick up and drop off riders 130A-130C. In some embodiments, autonomous vehicles capable of detecting objects on the road and navigating to designated locations may be utilized for providing ridesharing services.

In various embodiments, the ridesharing management server 150 is implemented on a single server or on multiple servers. Each server can be on a single computing device or distributed among multiple computing devices. In various embodiments, the ridesharing management system 100 includes multiple ridesharing management servers, and each ridesharing management server can serve a category of ridesharing services, ridesharing services associated with a certain category of service vehicles, and/or ridesharing services in a specific geographical region. For example, a first ridesharing management server can direct a first fleet of vehicles, a second ridesharing management server can direct a second fleet of vehicles and a third ridesharing server can direct a third fleet of vehicles. The first, second and third fleet of vehicles can be on-demand services, fixed-route services, or any combination thereof.

In some embodiments, a plurality of ridesharing management servers collectively provides a dynamic and integrated ridesharing service system.

As shown in FIG. 1, users 130A-130E may include a plurality of users 130A-130C, and a plurality of drivers 130D and 130E, who may communicate with one another, and with ridesharing management server 150 using various types of user devices 120 that are mobile communications devices. For example, the mobile communications device can include a display such as a television, tablet, computer monitor, video conferencing console, or laptop computer screen. A mobile communications device 120 can further include video/audio input devices such as a microphone, video camera, keyboard and/or web camera. A mobile communications device 120 can include mobile devices such as a tablet or a smartphone having display and/or video/audio capture capabilities. The mobile communications device can include one or more software applications that can facilitate the mobile communications devices to engage in communications, such as IM, VoIP and/or video conferences. For example, user devices 130A-130C can send requests to ridesharing management server 150, and receive confirmations therefrom. Drivers 130D and 130E can use their respective user devices 120D-120E to receive ride service assignments and navigation information from ridesharing management server 150, and may contact the users with their respective user devices 120D-120E.

In some embodiments, a user may directly hail a vehicle by hand gesture or verbal communication, such as traditional street vehicle hailing. In such embodiments, once a driver accepts the request, the driver can use his respective user device 120D-120E to input the ride request information. Ridesharing management server 150 can receive the information and accordingly assign one or more additional ride service assignments to the same vehicle, for example, assigning subsequent ride requests received from other user devices 120 through network 140.

In some embodiments, driver devices 120D and 120E, and driving-control device 120F may be embodied in a vehicle control panel, as a part of the vehicle control system associated with a particular vehicle. For example, a traditional taxi company may install a drive device in all taxi vehicles managed by the taxi company. In some embodiments, driver devices 120D and 120E, and driving-control device 120F, may be further coupled with a payment device, such as a card reader installed as a part of the vehicle control panel or as a separate device associated with the vehicle. A user may then use the payment device as an alternative payment mechanism. For example, a user who hails the taxi on the street may pay through the payment device, without using a user device providing ridesharing service.

In some embodiments, the rideshare management server 150 can receive a list of ride requests from a user (e.g., a rideshare provider, not shown). The rideshare management system 100 can receive the list of ride requests for a predefined time period, e.g., at night for the following day, for a scheduled 24-hour period, or any defined time period. Each ride in the list of ride requests can include a pick-up location, drop-off location, desired pick-up time, desired drop-off time, maximum delay between desired pick-up time and actual pick-up time, maximum delay between desired drop-off time and actual drop-off time, maximum distance between pick-up location and actual pick-up location, maximum distance between drop-off location and actual drop-off location, or any combination thereof.

Figure 2:
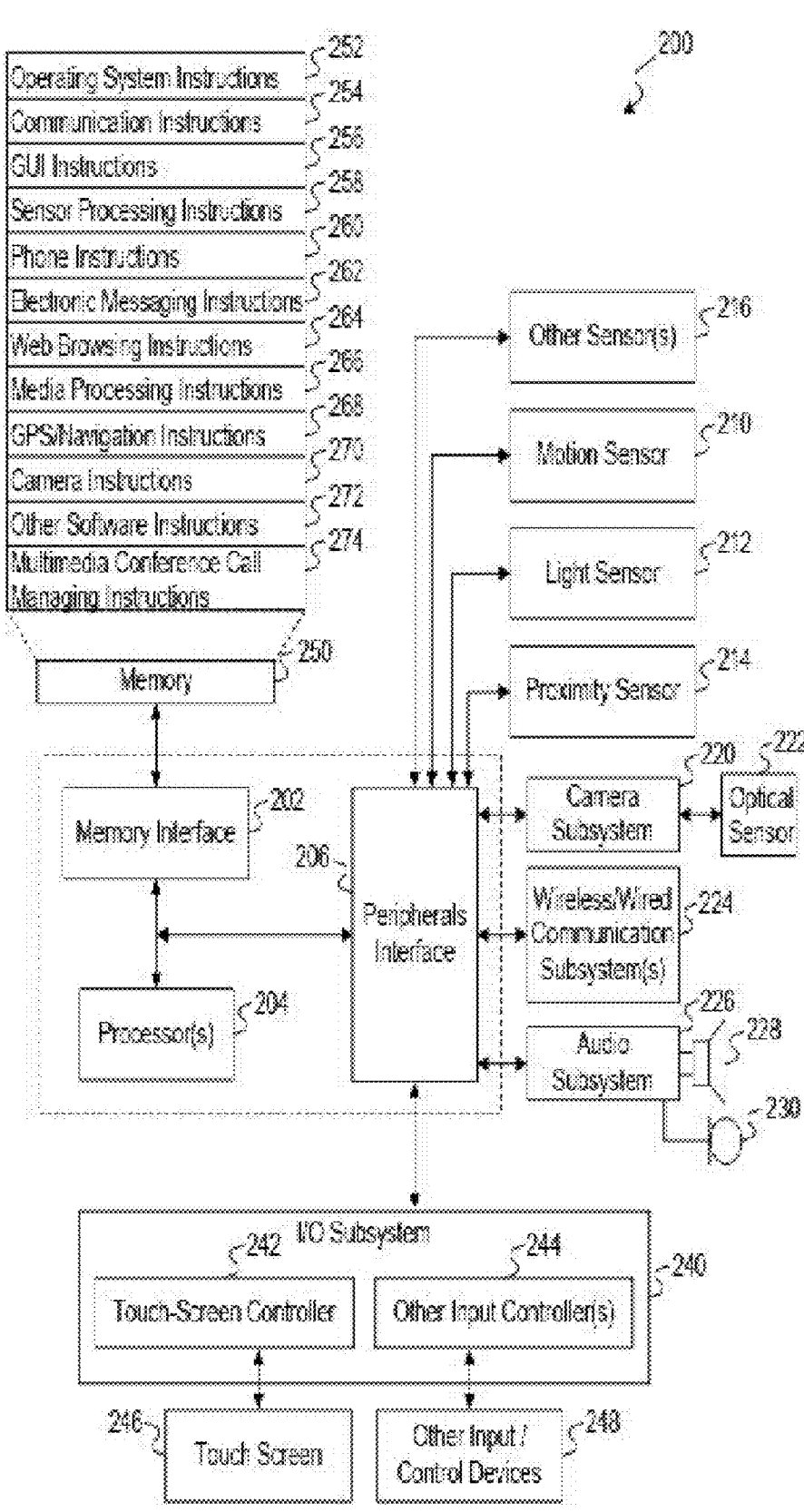
FIG. 2 is a diagram of a mobile communications device associated with a ridesharing management system, according to some embodiments of the invention.

FIG. 2 is a diagram of a mobile communications device 200 (e.g., user device 120 as shown above in FIG. 1) associated with a ridesharing management system (e.g., ridesharing management system 100 as shown above in FIG. 1), according to some embodiments of the invention. The mobile communications device 200 can be used to implement computer programs, applications, methods, processes, or other software to perform embodiments of the invention described herein. For example, turning back to FIG. 1, rider devices 120A-120C, driver devices 120D and 120E, and driving-control device 120F may respectively be installed with a rider side ridesharing application, and a corresponding driver side ridesharing application.

Turning back to FIG. 2, the mobile communications device 200 can include a memory interface 202, one or more processors 204 such as data processors, image processors and/or central processing units, and/or a peripherals interface 206. The Memory interface 202, one or more processors 204, and/or peripherals interface 206 can be separate components or can be integrated in one or more integrated circuits. The various components in mobile communications device 200 may be coupled by one or more communication buses or signal lines.

Sensors, devices, and subsystems can be coupled to peripherals interface 206 to facilitate multiple functionalities. For example, a motion sensor 210, a light sensor 212, and a proximity sensor 214 may be coupled to peripherals interface 206 to facilitate orientation, lighting, and/or proximity functions. One or more sensors 216 can be connected to peripherals interface 206, such as a positioning system (e.g., GPS receiver), a temperature sensor, a biometric sensor, and/or other sensing devices. A GPS receiver can be integrated with, or connected to, mobile communications device 200. For example, a GPS receiver may be included in mobile telephones, such as smartphone devices. GPS software can allow mobile telephones to use an internal and/or external GPS receiver (e.g., connecting via a serial port or Bluetooth). A camera subsystem 220 and/or an optical sensor 222, e.g., a charged coupled device ("CCD") or a complementary metal-oxide semiconductor ("CMOS") optical sensor, can be used to facilitate camera functions, such as recording photographs and video clips.

Communication functions can be facilitated through one or more wireless/wired communication subsystems 224, which can include an Ethernet port, radio frequency receivers and transmitters and/or optical (e.g., infrared) receivers and/or transmitters. The specific design and implementation of wireless/wired communication subsystem 224 may depend on the communication network(s) over which mobile communications device 200 is intended to operate. For example, in some embodiments, mobile communications device 200 may include wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and/or telephony functions.

I/O subsystem 240 may include touch screen controller 242 and/or other input controller(s) 244. Touch screen controller 242 may be coupled to touch screen 246. Touch screen 246 and touch screen controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246. While touch screen 246 is shown in FIG. 2, I/O subsystem 240 may include a display screen (e.g., CRT or LCD) in place of touch screen 246.

Other input controller(s) 244 may be coupled to other input/control devices 248, such as one or more buttons, rocker switches, thumb-wheel, infrared port, USB port, and/or a pointer device such as a stylus. Touch screen 246 may, for example, also be used to implement virtual or soft buttons and/or a keyboard.

Memory interface 202 may be coupled to memory 250. Memory 250 includes high-speed random access memory and/or non-volatile memory, such as one or more magnetic disk storage devices, one or more optical storage devices, and/or flash memory (e.g., NAND, NOR). Memory 250 may store an operating system 252, such as DRAWIN, RTXC, LINUX, iOS, UNIX, OS X, WINDOWS, or an embedded operating system such as VXWorkS. Operating system 252 may include instructions for handling basic system services and for performing hardware dependent tasks. In some implementations, operating system 252 can be a kernel (e.g., UNIX kernel).

Memory 250 may also store communication instructions 254 to facilitate communicating with one or more additional devices, one or more computers and/or one or more servers. Memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions.

In some embodiments, communication instructions 254 may include software applications to facilitate connection with ridesharing management server 150 (e.g., ridesharing management server 150 as described above in FIG. 1) that handles vehicle ridesharing requests. Graphical user interface instructions 256 may include a software program that facilitates a user associated with the mobile communications device to receive messages from ridesharing management server 150, provide user input, and so on. For example, a user may send ride requests and ride service parameters to a ridesharing management server and receive ridesharing proposals and confirmation messages. A driver may receive ride service assignments from ridesharing management server 150 and provide ride service status updates.

Each of the above identified instructions and applications may correspond to a set of instructions for performing one or more functions described above. These instructions need not be implemented as separate software programs, procedures, or modules. Memory 250 may include additional instructions or fewer instructions. Furthermore, various functions of mobile communications device 200 may be implemented in hardware and/or in software, including in one or more signal processing and/or application specific integrated circuits.

Figure 3:
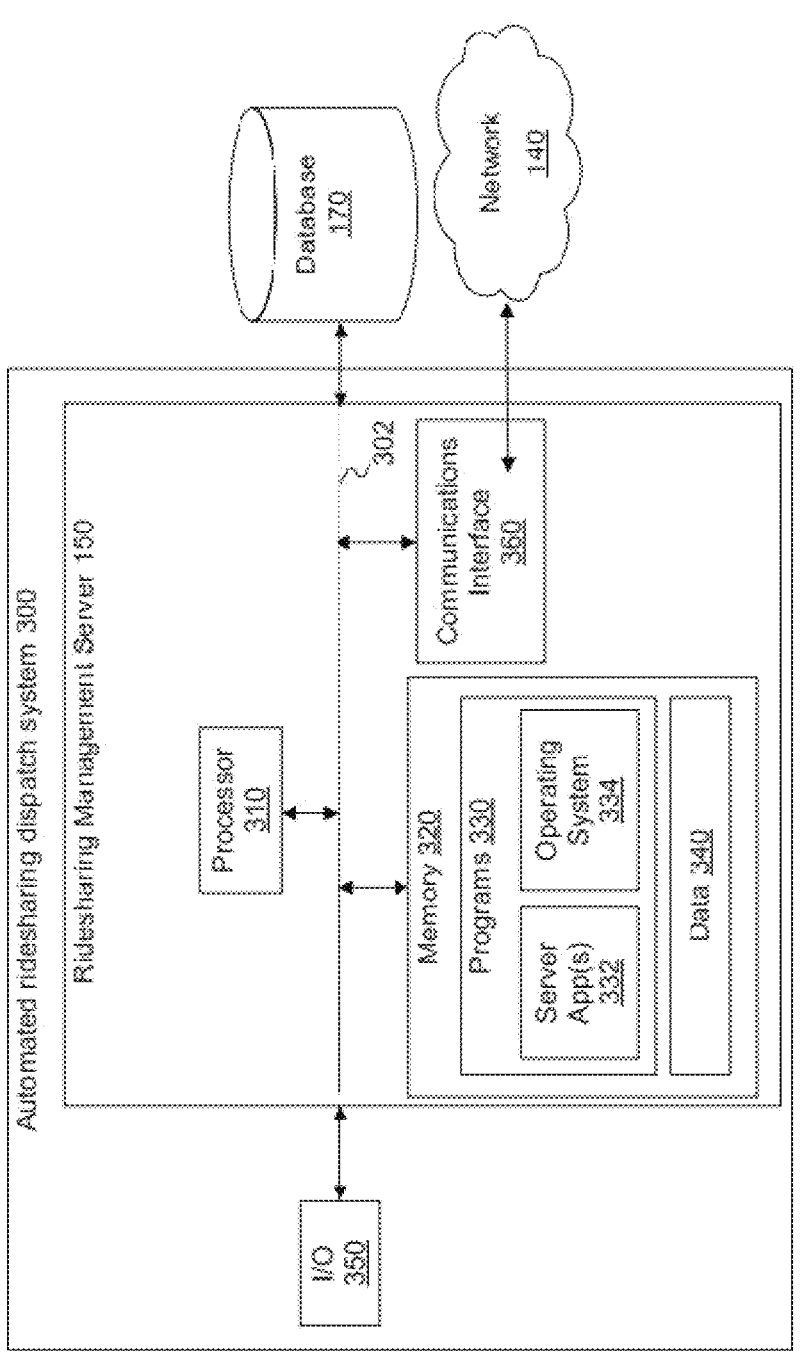
FIG. 3 is a diagram of an automated ridesharing dispatch system, including ridesharing management server associated with a ridesharing management system, according to some embodiments of the invention.

FIG. 3 is a diagram of an automated ridesharing dispatch system 300, including a ridesharing management server (e.g., ridesharing management server 150 as described above in FIG. 1) associated with a ridesharing management system (e.g., ridesharing management system 100 as described above in FIG. 1), according to some embodiments of the invention. The ridesharing management server 150 can include a bus 302 (or other communication mechanism), which interconnects subsystems and/or components for transferring information within the ridesharing management server 150.

As shown in FIG. 3, automated ridesharing dispatch system 300 may include one or more processors 310, one or more memories 320 storing programs 330 including, for example, server app(s) 332, operating system 334, and data 340, and a communications interface 360 (e.g., a modem, Ethernet card, or any other interface configured to exchange data with a network, such as network 140 in FIG. 1). Automated ridesharing dispatch system 300 can communicate with an external database (e.g., external databased 170 as described above with respect to FIG. 1). Automated ridesharing dispatch system 300 can include a single server (e.g., ridesharing management server 150) and/or can be configured as a distributed computer system including multiple servers, server farms, clouds, and/or computers that can interoperate to perform one or more of the processes and functionalities associated with embodiments.

The ridesharing management server 150 can be a computer platform that provides services via a network, such as the Internet. It can use virtual machines that may not correspond to individual hardware. The computational and/or storage capabilities can be implemented by allocating appropriate portions of desirable computation/storage power from a scalable repository, such as a data center and/or a distributed computing environment.

Processor 310 may be one or more processing devices configured to perform functions of the disclosed methods, such as a microprocessor manufactured by Intel™ or manufactured by AMD™. Processor 310 can include a single core or multiple core processors executing parallel processes simultaneously. For example, processor 310 may be a single core processor with virtual processing technologies. In some embodiments, processor 310 can use logical processors to simultaneously execute and/or control multiple processes. Processor 310 can implement virtual machine technologies, and/or other technologies to provide the ability to execute, control, run, manipulate, and/or store multiple software processes, applications and/or programs. In some embodiments, processor 310 includes a multiple-core processor arrangement (e.g., dual and/or quad core) to provide parallel processing functionalities to allow ridesharing management server 150 to execute multiple processes simultaneously. It is appreciated by one of ordinary skill in the art that other types of processor arrangements can be implemented that provide for the capabilities disclosed herein.

Memory 320 can be a volatile or non-volatile, magnetic, semiconductor, tape, optical, removable, non-removable, or other type of storage device or tangible or non-transitory computer-readable medium that stores one or more program(s) 330 such as server apps 332 and operating system 334, and data 340. Common forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM or any other flash memory, NVRAM, a cache, a register, any other memory chip or cartridge, and/or networked versions of the same.

The ridesharing management server (e.g., ridesharing management server 150 as described above in FIG. 1) can include one or more storage devices configured to store information used by processor 310 (or other components) to perform certain functions related to the embodiments. For example, the ridesharing management server may include memory 320 that includes instructions to enable processor 310 to execute one or more applications, such as server apps 332, operating system 334, and/or any other type of application or software known to be available on computer systems. In some embodiments, the instructions, and/or application programs, can be stored in an external database 170 (which can also be internal to ridesharing management server 150) or external storage communicatively coupled with ridesharing management server 150 (not shown), such as one or more database or memory accessible over network 140.

Database 170 or other external storage may be a volatile or non-volatile, magnetic, semiconductor, tape, optical, removable, non-removable, or other type of storage device or tangible or non-transitory computer-readable medium. Memory 320 and database 170 may include one or more memory devices that store data and instructions used to perform one or more features of the disclosed embodiments. Memory 320 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, ridesharing management server 150 may be communicatively connected to one or more remote memory devices (e.g., remote databases (not shown)) through network 140 or a different network. The remote memory devices can be configured to store information that ridesharing management server 150 can access and/or manage. By way of example, the remote memory devices may include document management systems, Microsoft SQL database, SharePoint databases, Oracle™ databases, Sybase™ databases, or other relational databases. Systems and methods consistent with disclosed embodiments, however, are not limited to separate databases or even to the use of a database.

Programs 330 may include one or more software modules causing processor 310 to perform one or more functions of the disclosed embodiments. Moreover, processor 310 may execute one or more programs located remotely from one or more components of the ridesharing management system 100. For example, ridesharing management server 150 may access one or more remote programs that, when executed, perform functions related to disclosed embodiments.

In the presently described embodiment, server app(s) 332 may cause processor 310 to perform one or more functions of the disclosed methods. For example, devices associated with users, drivers and autonomous vehicles may respectively be installed with user applications for vehicle ride-sharing services, and driver applications for vehicle ride-sharing services. Further, a mobile communications device may be installed with both the driver applications and the user applications, for uses in corresponding situations.

In some embodiments, other components of ridesharing management system 100 may be configured to perform one or more functions of the disclosed methods. For example, mobile communications devices 120 may be configured to calculate estimate pick-up and drop-off times based on a certain ride request, and may be configured to calculate estimate ride fares. As another example, mobile communications devices 120 may further be configured to provide navigation service, and location service, such as directing the user to a particular pick-up or drop-off location, and providing information about a current location of the respective user or vehicle to ridesharing management server 150.

In some embodiments, program(s) 330 may include operating system 334 performing operating system functions when executed by one or more processors such as processor 310. By way of example, operating system 334 may include Microsoft Windows™, Unix™, Linux™, Apple™ operating systems, Personal Digital Assistant (PDA) type operating systems, such as Apple iOS, Google Android, Blackberry OS, Microsoft CE™, or other types of operating systems. Accordingly, the disclosed embodiments may operate and function with computer systems running any type of operating system 334. Ridesharing management server 150 may also include software that, when executed by a processor, provides communications with network 140 through communications interface 360 and/or a direct connection to one or more mobile communications devices 120. Specifically, communications interface 360 may be configured to receive ride requests (e.g., from user devices 120A-120C) headed to differing destinations, and receive indications of the current locations of the ridesharing vehicles (e.g., from driver devices 120D and 120E or driving-control device 120F). In one example, communications interface 360 may be configured to continuously or periodically receive current vehicle location data for the plurality of ridesharing vehicles that are part of ridesharing management system 100. The plurality of ridesharing vehicles can be a car fleet, bus fleet or any combination thereof. The current vehicle location data may include global positioning system (GPS) data include number of ride service assignments completed, ratings, ride service history, rider ride history, driver service record, and/or communications between a driver and a rider regarding a particular ride request. In some embodiments, data 340 may further include traffic data, toll road information, and navigation information, which may be used for handling and accommodating ride requests.

Automated ridesharing dispatch system 300 may also include one or more I/O devices 350 having one or more interfaces for receiving signals or input from devices and providing signals or output to one or more devices that allow data to be received and/or transmitted by automated ride-sharing dispatch system 300. For example, automated ride-sharing dispatch system 300 may include interface components for interfacing with one or more input devices, such as one or more keyboards, mouse devices, and the like, that enable automated ridesharing dispatch system 300 to receive input from an operator or administrator (not shown).

Figure 4:
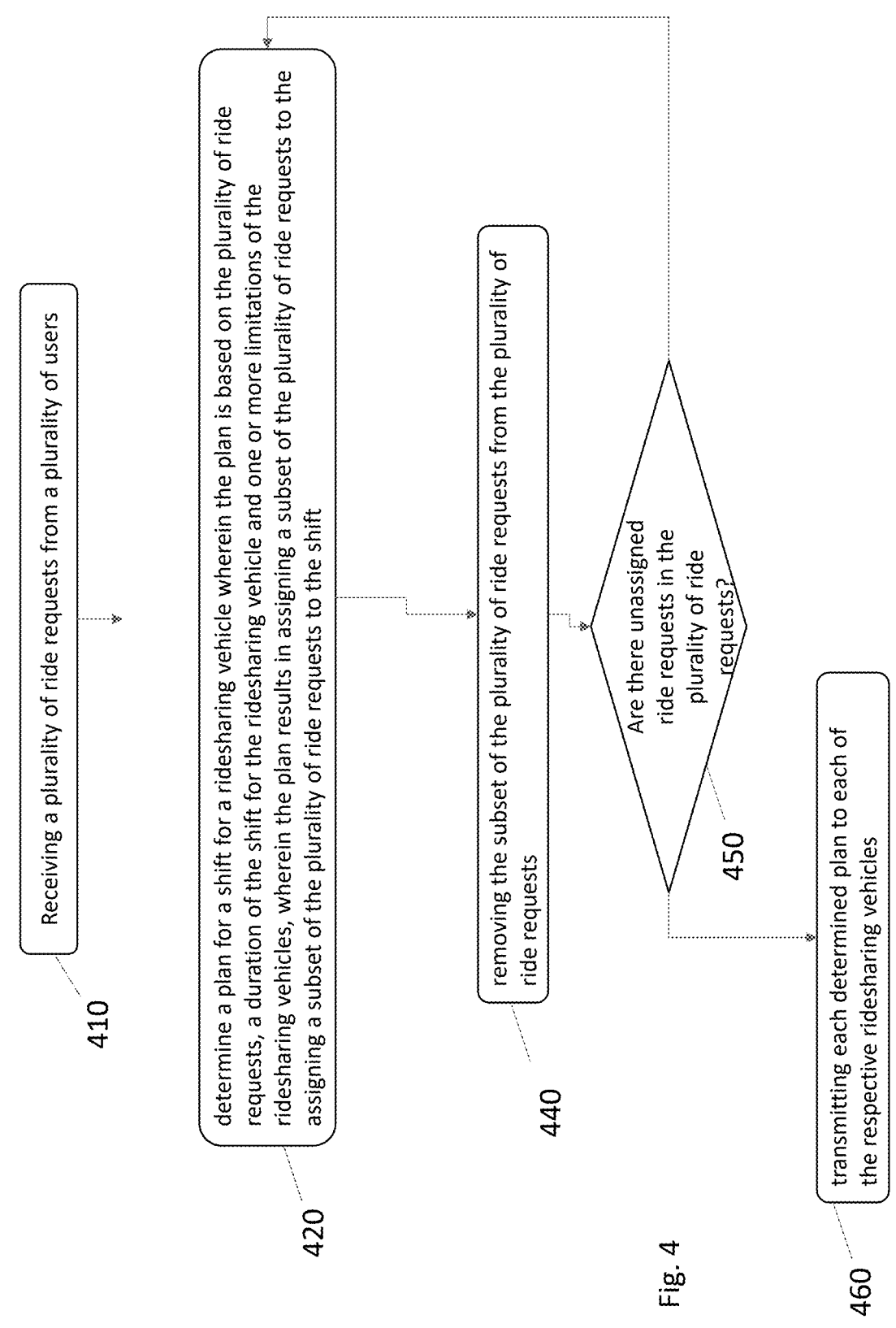
FIG. 4 is a flow diagram for a method of managing a fleet of ridesharing vehicles, according to some embodiments of the invention.

FIG. 4 is a flowchart for a method for managing (e.g., via a rideshare management server 150 over a network 140, as described above in FIG. 1) a fleet of ridesharing vehicles (e.g., users in fleet 130D, 130E, and 130F, as described above in FIG. 1), according to some embodiments of the invention.

The method involves receiving (e.g., via the communications interface 360 as described above with respect to FIG. 3) a plurality of ride requests from a plurality of users (Step 410). The plurality of ride requests can be received a minimum amount of time prior to a start time of the imminent ride request in the plurality of ride requests. For example, the minimum amount of time can be 12 hours, 24 hours, or any amount of time. The plurality of ride requests can be for a predefined time period. The predefined time period can be a 12-hour period, 24-hour period or any hour period.

Each ride in the list of ride requests can include a pick-up location, drop-off location, desired pick-up time, desired drop-off time, maximum delay between desired pick-up time and actual pick-up time, maximum delay between desired drop-off time and actual drop-off time, maximum distance between pick-up location and actual pick-up location, maximum distance between drop-off location and actual drop-off location, or any combination thereof.

For example, assume there are three ride requests in the plurality of ride requests, as shown below in Table 1.

TABLE 1

| Rider Id | Pickup time request | Dropoff time request | Pickup location | Dropoff location | Request Tags |
|---|---|---|---|---|---|
| 1 | 13:15 | | 1 The Origin, NY, NY | 1 The Dest, NY, NY | [Wheelchair] |
| 2 | | 11:30 | 10 The Origin, NY, NY | 10 The Dest, NY, NY | |
| 3 | 16:20 | 17:10 | 100 The Origin, NY, NY | 100 The Dest, NY, NY | [Ambulatory] | generated by at least one GPS component of a mobile communications device 120 associated with each ridesharing vehicle.

In some embodiments, data 340 may include, for example, profiles of users, such as user profiles or driver profiles. User profiles can include contact information, profile photos, user account information and/or associated mobile communications device information. Rider account information can include ride history, service feedback, complaints, and/or comments. Driver account information can The method can also involve determining a plan for a shift of a ridesharing vehicle wherein the plan is based on the plurality of ride requests, a duration of the shift for the ridesharing vehicle and one or more limitations of the ridesharing vehicles, wherein the plan results in assigning a subset of the plurality of ride requests to the shift (Step 420).

The one or more limitations can include a maximum duration a driver can continuously drive, a number of breaks, a duration for each break, a minimal time for a shift and/or a total length of the shift. The plan can include a start time, an end time, a driver start break time and a driver end break time.

In various embodiments, the one or more limitations are based on driver fatigue rules where the driver fatigue rules are based on a total drive time over a predetermined drive period (e.g., 10 hours, 12 hours, or 24 hours), and/or a continuous drive time (e.g., 3 hours, 4 hours, or 5 hours). For example, the one or more limitations can include a total drive time of 10 hours, a duration for each break of 1 hour, a number of breaks of 1 hour, and a maximum duration a driver can continuously drive of 4 hours. In this example, the plan can be determined to be a first 4-hour shift followed by a first one-hour break, and a second four-hour shift with a second one-hour break.

In some embodiments, a plan is determined for an entire duration of a shift (e.g., hourly, hours and minutes, or any time duration input). The entire duration of a shift can be an entire duration of the service day. An optimization can be performed on the shift of the entire duration such that the shift duration can be reduced. The optimization can be to determine a window within the entire duration of the shift that maximizes utilization based on one or more limitations (e.g., the one or more limitations as described above).

Table 2 shows an example of a plan for an entire shift.

TABLE 2

| Rider Id | Pickup time request | Dropoff time request (if provided) | From Location | To Location |
|---|---|---|---|---|
| 1 | 6:12 | | L1 | L2 |
| 2 | 6:25 | | L3 | L4 |
| 3 | 7:10 | | L5 | L6 |
| 4 | 7:15 | | L7 | L8 |
| 5 | 7:30 | | L9 | L10 |
| 6 | 8:05 | | L11 | L12 |

In some embodiments, determining the plan for a shift of the ridesharing vehicle can involve segmenting the plan that is based on the entire duration of the shift, and determining which segments are optimal. The segments can be determined by splitting the plan for the entire duration based on when the vehicle is empty. In some embodiments, the splitting is done before every pickup and drop off. In some embodiments, the splitting is done even when there are passengers in the vehicle by ignoring them from the plan, after a predetermined duration. In these embodiments, the passengers remain for the next iteration.

Determining the plan for the shift for each segment can involve for each potential first pick-up location, determining a distance to the nearest vehicle depot and, for each potential last drop-off, determining a distance to the vehicle depot. Determining the plan for the shift for each segment can involve for each segment determining a shift length and utilizations. The utilizations can be determined by dividing a number of rides between the first pick-up location of the segment and the final drop-off location of the segment and dividing by the length of the shift of the segment.

Determining the plan for the ridesharing vehicle can also involve selecting a segment with the most utilizations. If one or more segments have the highest utilizations that are equal, the segment can be randomly chosen between the pairs with the highest utilizations.

In some embodiments when the plan is determined, it is determined for a shift that has one or more limitations that are not specific to any particular ridesharing vehicle. In this manner, a plurality of shifts, e.g., if there are a plurality of rides to be assigned that do not fit into one shift based on the one or more limitations, can have plans determined and, after the plans are determined, the plans can be assigned to particular ridesharing vehicles based on availability of the particular ridesharing vehicle.

In some embodiments, when the plan is determined, it is determined for a shift that has one or more limitations that are specific to a particular ridesharing vehicle (e.g., a start location that is not the depot where the ridesharing vehicle is located or number of passenger seats) such that the plan is assigned to the particular ridesharing vehicle. In these embodiments, plans can be made for specific vehicles in a fleet.

The method can also involve removing the subset of the plurality of ride requests from the plurality of ride requests (Step 440). Continuing with the above example, ride requests #1-5 are assigned to vehicle #1, and thus they are removed from the plurality of ride requests which includes 20 ride requests. Thus, the plurality of ride requests is now 15.

The method can also involve determining if there are unassigned ride requests in the plurality of ride requests (Step 450), and if so, going back to step 420. Continuing with the above example, there are 15 unassigned ride requests, thus in this example the method goes back to step 420. As is apparent to one of ordinary skill in the art, once all of the ride requests in the plurality of ride requests are planned, the method can move on to Step 460, as described below.

The method can also involve transmitting each determined plan to each of the respective ridesharing vehicles (Step 460).

Figure 5:
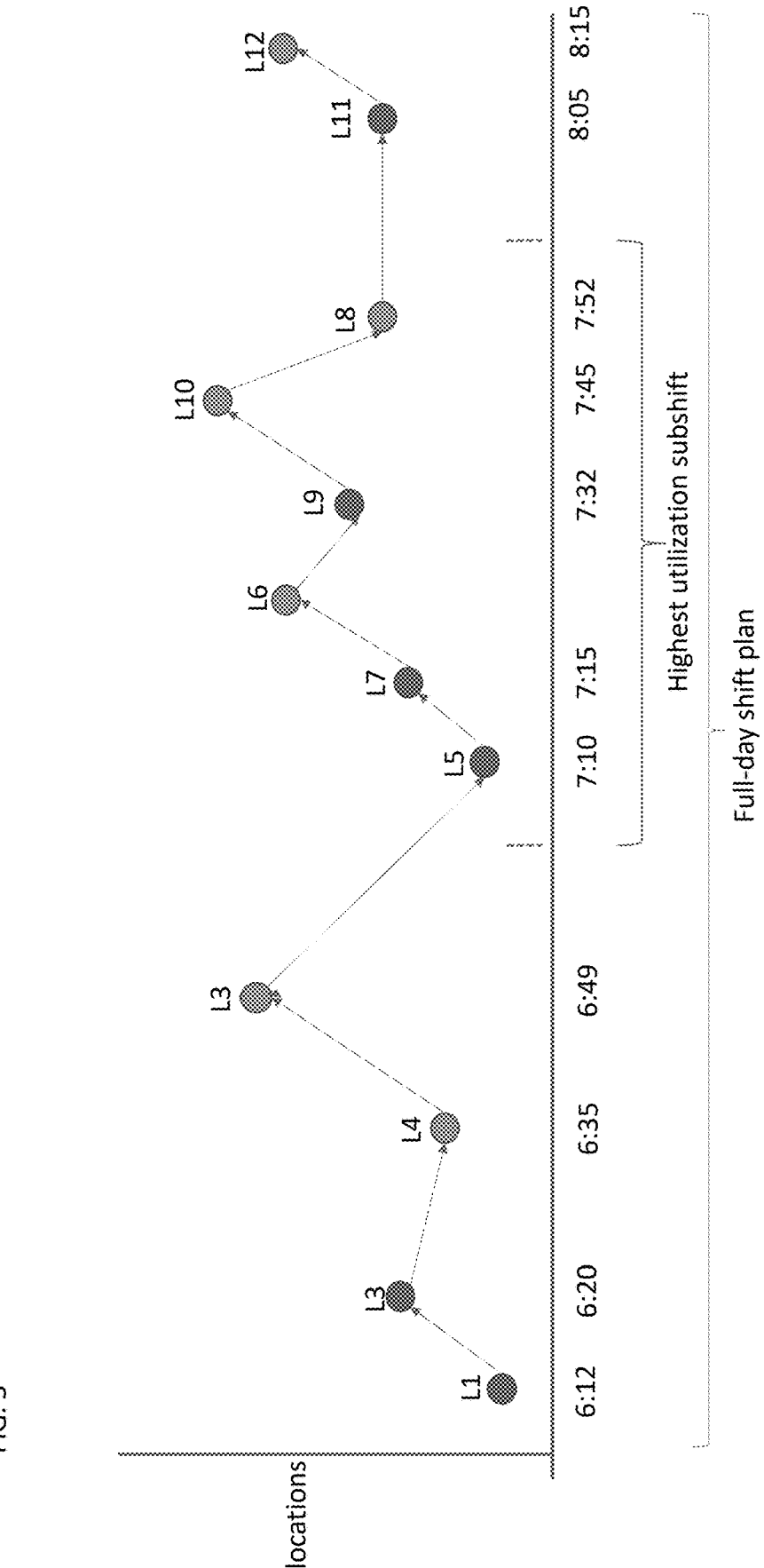
FIG. 5 shows a graph of a plan for an entire shift and an optimal segment, according to some embodiments of the invention.

FIG. 5 shows a graph of a plan for an entire shift and an optimal segment, according to some embodiments of the invention. The graph shows the entire shift extends from time 6:12 to 8:15, and the plan entails picking up rider 1 at location L1, rider 2 at location L3, dropping of rider 1 at location L4 and so forth. The graph also shows an example of a segment from L5 to L8 that can be an optimal segment (e.g., highest utilization sub-shift) that can be determined, for example, using the method as described above in FIG. 4. For example, assume that after measuring the distance of each pick-up and drop-off from the nearest depot, the optimal sub-shift is from the pick-up of rider 3 until the drop-off of rider 5. Assume the nearest depot to location L5 (the first pickup in the sub-shift) is 7 minutes away, and the nearest depot to location L10 (the last dropoff in the sub-shift) is 90 minutes away, then the final shift will start at 7:03 and end at 7:59. Accordingly, FIG. 5 shows an example of a determined optimal plan.

In some embodiments, each plan is assigned to a ridesharing vehicle. The assigning can be done automatically by the ridesharing management system 100. The ridesharing management system 100 can determine vehicles from the fleet of vehicles having availability that matches plans, such that each vehicle is assigned one matching plan.

One skilled in the art will realize the invention can be embodied in other specific forms without departing from the spirit or essential characteristics thereof. The foregoing embodiments are therefore to be considered in all respects illustrative rather than limiting of the invention described herein. The scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above-described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN)), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stored on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. The scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

The invention claimed is:

1. A system for managing a fleet of ridesharing vehicles, the system comprising:

a communications interface configured to receive, at a ridesharing management server, a plurality of ride requests from a plurality of users, wherein a number of the plurality of ride requests is equal to or greater than 1000 and a number of vehicles in the fleet of ridesharing vehicles is equal to or greater than 50;

the ridesharing management server configured to:

i) determine a plan for a shift of a ridesharing vehicle for a plurality of ridesharing vehicles in the fleet of ridesharing vehicles, wherein the plan is based on the plurality of ride requests, a duration of the shift for the respective ridesharing vehicle and one or more limitations of the respective ridesharing vehicles, wherein the plan results in assigning a subset of the plurality of ride requests to the shift, wherein the plan is determined twelve hours or less in advance of each of the ridesharing vehicles in the fleet executing the plan, and wherein at least two ride requests in the subset of the plurality of ride requests have different pick-up locations and different pickup-times;

ii) removing the subset of the plurality of ride requests from the plurality of ride requests;

iii) if there are remaining unassigned plurality of ride requests, returning to step i), otherwise, assign each determined plan to each of the respective ridesharing vehicles; and direct each ridesharing vehicle in the fleet of ridesharing vehicles with an assigned plan to pickup and drop off according to a schedule of pick-up times and pick-up locations and drop-off locations of each respective assigned plan, wherein the ridesharing vehicles in the fleet of ridesharing vehicles are autonomous vehicles wherein during execution of the route, each of the ride-sharing vehicles transmits, via the ridesharing management system, a current location determined from a GPS receiver in each of the ridesharing vehicles and updating, by the ridesharing management system, the route of each of the ridesharing vehicles based on the current location.

2. The system of claim 1 wherein the plurality of ride requests are received over a predefined time duration.

3. The system of claim 1 wherein the plurality of ride requests includes pick-up time and pick-up location.

4. The system of claim 1 wherein each plan includes a start time, an end time, a driver start break time and a driver end break time.

5. The system of claim 1 wherein the one or more limitations includes a maximum duration a driver can continuously drive, a number of breaks, a duration for each break, minimal time for a shift, total length of the shift, or any combination thereof.

6. The system of claim 1 wherein to determine a plan, the processor is further configured to:

segment the shift and determine an optimal shift from the segments, wherein segmenting is based on when the vehicle is empty, before every pick up and drop off, after a predetermined duration or any combination thereof, and wherein determining an optimal shift is based on a distance of each segment's potential first pick-up location to a nearest vehicle depot, distance for each potential last drop-off to a nearest vehicle depot, utilizations for the segment, shift length or any combination thereof.

7. The system of claim 1 wherein the processor is further configured to assign each determined plan to a corresponding vehicle.

8. The method of claim 1 wherein directing each ridesharing vehicle in the fleet of ridesharing vehicles further comprises transmitting, by the ridesharing management system, a map including a route to a display of a device of each of the ridesharing vehicles to guide each ridesharing vehicle.

9. A method for managing a fleet of ridesharing vehicles, the method comprising:

receiving, at a ridesharing management server via a communications interface, a plurality of ride requests from a plurality of users, wherein a number of the plurality of ride requests is equal to or greater than 1000 and a number of vehicles in the fleet of ridesharing vehicles is equal to or greater than 50;

i) determining, via the ridesharing management server, a plan for a shift of the ridesharing vehicle for a plurality of ridesharing vehicles in the fleet of ridesharing vehicles, wherein the plan is based on the plurality of ride requests, a duration of the shift for the respective ridesharing vehicle and one or more limitations of the respective ridesharing vehicles, wherein the plan results in assigning a subset of the plurality of ride requests to the shift, wherein at least two ride requests in the subset of the plurality of ride requests have different pick-up locations and different pick-up times;

ii) removing, via the ridesharing management server the subset of the plurality of ride requests from the plurality of ride requests; and iii) if there are remaining unassigned plurality of ride requests, returning to step i), otherwise, assign, via the ridesharing management server each determined plan to each of the respective ridesharing vehicles; and directing, via the ridesharing management server, each ridesharing vehicle in the fleet of ridesharing vehicles with an assigned plan to pickup and drop off according to a schedule of pick-up times and pick-up locations and drop-off locations of each respective assigned plan, wherein the ridesharing vehicles in the fleet of ridesharing vehicles are autonomous vehicles, wherein during execution of the route, each of the ridesharing vehicles transmits, via the ridesharing management system, a current location determined from a GPS receiver in each of the ridesharing vehicles and updating, by the ridesharing management system, the route of each of the ridesharing vehicles based on the current location.

10. The method of claim 9 wherein the plurality of ride requests are received over a predefined time duration.

11. The method of claim 9 wherein the plurality of ride requests includes pick-up time and pick-up location.

12. The method of claim 9 wherein each plan includes a start time, an end time, a driver start break time and a driver end break time.

13. The method of claim 9 wherein the one or more limitations includes a maximum duration a driver can continuously drive, a number of breaks, a duration for each break, minimal time for a shift, total length of the shift, or any combination thereof.

14. The method of claim 9 wherein determining a plan further comprises segmenting the shift and determine an optimal shift from the segments, wherein segmenting is based on when the vehicle is empty, before every pick up and drop off, after a predetermined duration or any combination thereof, and wherein determining an optimal shift is based on a distance of each segment's potential first pick-up location to a nearest vehicle depot, distance for each potential last drop-off to a nearest vehicle depot, utilizations for the segment, shift length or any combination thereof.

15. The method of claim 9 further comprising assigning each determined plan to a corresponding vehicle.

* * * * *